US012530616B2

United States Patent
Courtney et al.

(10) Patent No.: US 12,530,616 B2
(45) Date of Patent: Jan. 20, 2026

(54) MACHINE LEARNING TRACEBACK-ENABLED DECISION RATIONALES AS MODELS FOR EXPLAINABILITY

(71) Applicant: Oracle International Corporation, Redwood Shores, CA (US)

(72) Inventors: John Frederick Courtney, Benton, LA (US); Kenneth Paul Baclawski, Waltham, MA (US); Dieter Gawlick, Palo Alto, CA (US); Kenny C. Gross, Escondido, CA (US); Guang Chao Wang, San Diego, CA (US); Anna Chystiakova, Redwood Shores, CA (US); Richard Paul Sonderegger, Dorchester, MA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1167 days.

(21) Appl. No.: 17/379,937

(22) Filed: Jul. 19, 2021

(65) Prior Publication Data
US 2022/0237509 A1     Jul. 28, 2022

Related U.S. Application Data

(60) Provisional application No. 63/141,965, filed on Jan. 26, 2021.

(51) Int. Cl.
| | |
|---|---|
| *G06N 20/00* | (2019.01) |
| *G06F 11/32* | (2006.01) |
| *G06N 5/045* | (2023.01) |

(52) U.S. Cl.
CPC .......... *G06N 20/00* (2019.01); *G06F 11/327* (2013.01); *G06N 5/045* (2013.01)

(58) Field of Classification Search
CPC .......... G06N 20/00; G06N 5/045; G06N 7/01; G06N 20/10; G06N 3/08; G06N 20/20;
(Continued)

(56) References Cited

U.S. PATENT DOCUMENTS

| | | | |
|---|---|---|---|
| 6,188,831 B1 | 2/2001 | Ichimura | |
| 6,499,021 B1 * | 12/2002 | Abu-Hakima | G06Q 10/10 706/45 |

(Continued)

FOREIGN PATENT DOCUMENTS

| | | | |
|---|---|---|---|
| JP | 2004-523735 A | 8/2004 | |
| JP | 2012-137934 A | 7/2012 | |

OTHER PUBLICATIONS

Gross et al., "A supervisory control loop with Prognostics for human-in-the-loop decision support and control applications", 2017 IEEE Conference on Cognitive and Computational Aspects of Situation Management (CogSIMA), Mar. 2017, 7 Pages.

(Continued)

*Primary Examiner* — Luis A Sitiriche
(74) *Attorney, Agent, or Firm* — Invoke

(57) ABSTRACT

Techniques for providing decision rationales for machine-learning guided processes are described herein. In some embodiments, the techniques described herein include processing queries for an explanation of an outcome of a set of one or more decisions guided by one or more machine-learning processes with supervision by at least one human operator. Responsive to receiving the query, a system determines, based on a set of one or more rationale data structures, whether the outcome was caused by human operator error or the one or more machine-learning processes. The system then generates a query response indicating whether the outcome was caused by the human operator error or the one or more machine-learning processes.

20 Claims, 10 Drawing Sheets

(58) Field of Classification Search
CPC ........ G06N 3/043; G06N 3/044; G06N 3/045;
G06N 3/049; G06N 3/088; G06N 5/01;
G06N 5/022; G06N 5/046; G06F 11/327;
G06F 11/3058; G06F 11/3409; G06F
11/3495
See application file for complete search history.

(56) References Cited

U.S. PATENT DOCUMENTS

| | | | |
|---|---|---|---|
| 7,167,812 | B1 | 1/2007 | Urmanov et al. |
| 8,346,914 | B2 | 1/2013 | Vaidyanathan et al. |
| 10,055,275 | B2* | 8/2018 | Razin .................. G06F 11/3051 |
| 10,275,331 | B1* | 4/2019 | Gudka .................. G06F 11/079 |
| 11,366,844 | B2 | 6/2022 | Bhave et al. |
| 11,637,740 | B2* | 4/2023 | Sharma ................. H04W 24/10 455/423 |
| 12,093,253 | B2 | 9/2024 | Galitsky |
| 2003/0158694 | A1 | 8/2003 | Wegerich |
| 2008/0077547 | A1* | 3/2008 | Thurimella ............ G06Q 30/02 706/46 |
| 2009/0228408 | A1 | 9/2009 | Kaushal et al. |
| 2012/0179421 | A1 | 7/2012 | Dasgupta |
| 2013/0110761 | A1 | 5/2013 | Viswanathan et al. |
| 2013/0282336 | A1 | 10/2013 | Maeda et al. |
| 2014/0163712 | A1 | 6/2014 | Waterman et al. |
| 2017/0177546 | A1 | 6/2017 | Heinz et al. |
| 2017/0230410 | A1* | 8/2017 | Hassanzadeh ......... G06N 20/00 |
| 2017/0339022 | A1 | 11/2017 | Hegde et al. |
| 2018/0060151 | A1 | 3/2018 | Gross et al. |
| 2018/0122506 | A1* | 5/2018 | Grantcharov ....... H04L 63/0421 |
| 2018/0349790 | A1 | 12/2018 | Cai et al. |
| 2019/0132190 | A1 | 5/2019 | Jeyakumar et al. |
| 2019/0236162 | A1 | 8/2019 | Gross et al. |
| 2019/0243799 | A1 | 8/2019 | Gross et al. |
| 2019/0250950 | A1 | 8/2019 | Huang et al. |
| 2019/0268214 | A1 | 8/2019 | Maes et al. |
| 2019/0286725 | A1 | 9/2019 | Gawlick et al. |
| 2019/0310617 | A1 | 10/2019 | Li et al. |
| 2019/0392330 | A1 | 12/2019 | Martineau et al. |
| 2020/0021607 | A1* | 1/2020 | Muddu .................. H04L 43/00 |
| 2020/0184351 | A1 | 6/2020 | Wang et al. |
| 2020/0372385 | A1 | 11/2020 | Wang et al. |
| 2020/0403991 | A1 | 12/2020 | Sohail et al. |
| 2021/0255917 | A1 | 8/2021 | Reitbauer et al. |
| 2021/0357281 | A1 | 11/2021 | Malboubi et al. |
| 2021/0406110 | A1 | 12/2021 | Vaid et al. |
| 2023/0061280 | A1 | 3/2023 | Rohrkemper et al. |

OTHER PUBLICATIONS

Brito et al., "An Explainable Artificial Intelligence Approach for Unsupervised Fault Detection and Diagnosis in Rotating Machinery", arxiv.org, Cornell University Library, 201 Olin Library Cornell University Ithaca, NY 14853, Feb. 23, 2021, 25 Pages.

Gross et al., "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

Lundberg et al., "A Unified Approach to Interpreting Model Predictions", arxiv.org, Cornell University Library, 201 Olin Library Cornell University Ithaca, NY 14853, Nov. 25, 2017, 10 Pages.

Gortler, Jochen, et al., "Uncertainty-aware principal component analysis," IEEE Transactions on Visualization and Computer Graphics 26.1 (2019): 822-831 (Year: 2019).

* cited by examiner

MACHINE LEARNING TRACEBACK-ENABLED DECISION RATIONALES AS MODELS FOR EXPLAINABILITY

RELATED APPLICATIONS; INCORPORATION BY REFERENCE

This application claims the benefit of U.S. Provisional Patent Application 63/141,965, filed Jan. 26, 2021, which is hereby incorporated by reference.

This application is related to U.S. Pat. No. 5,764,509, titled "Industrial Process Surveillance System"; U.S. Pat. No. 6,470,333, titled "Knowledge Extraction System and Method"; and U.S. Pat. No. 7,281,112, titled "Method for Storing Long-Term Performance Data in a Computer System with Finite Storage Space", the entire contents for each of which are incorporated by reference as if set forth in their entirety.

TECHNICAL FIELD

The present disclosure relates to machine-learning models, ontologies, and applications. In particular, the present disclosure relates to integrating traceback capabilities with machine-learning techniques to explain and analyze model behavior.

BACKGROUND

Machine-learning (ML) models may be used to automate and/or guide decision making for a variety of applications. As an example, ML-based ontologies may guide human-in-the-loop situation awareness for supervisory control of mission-critical and safety-critical assets. As another example, ML-based ontologies may analyze the behavior of system parts, subsystems, and/or other components to detect whether the components are properly functioning. An ML-based ontology may reduce No-Trouble-Found (NTF) replacements, which may in turn avoid significant, unnecessary replacement costs and/or system downtime.

One challenge with ML-based solutions is to provide models that are highly explainable and interpretable. Many ML models are integrated as black boxes that provide little or no explanation of how a given output was derived from a given set of inputs. Explainability is particularly difficult with certain types of ML models, such as neural networks and support vector machines, that use stochastic optimization of the weights and/or other model parameters. When an ML-based solution has limited explainability, it may not be feasible for outside agents to determine the decision paths that led to events with poor or successful outcomes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
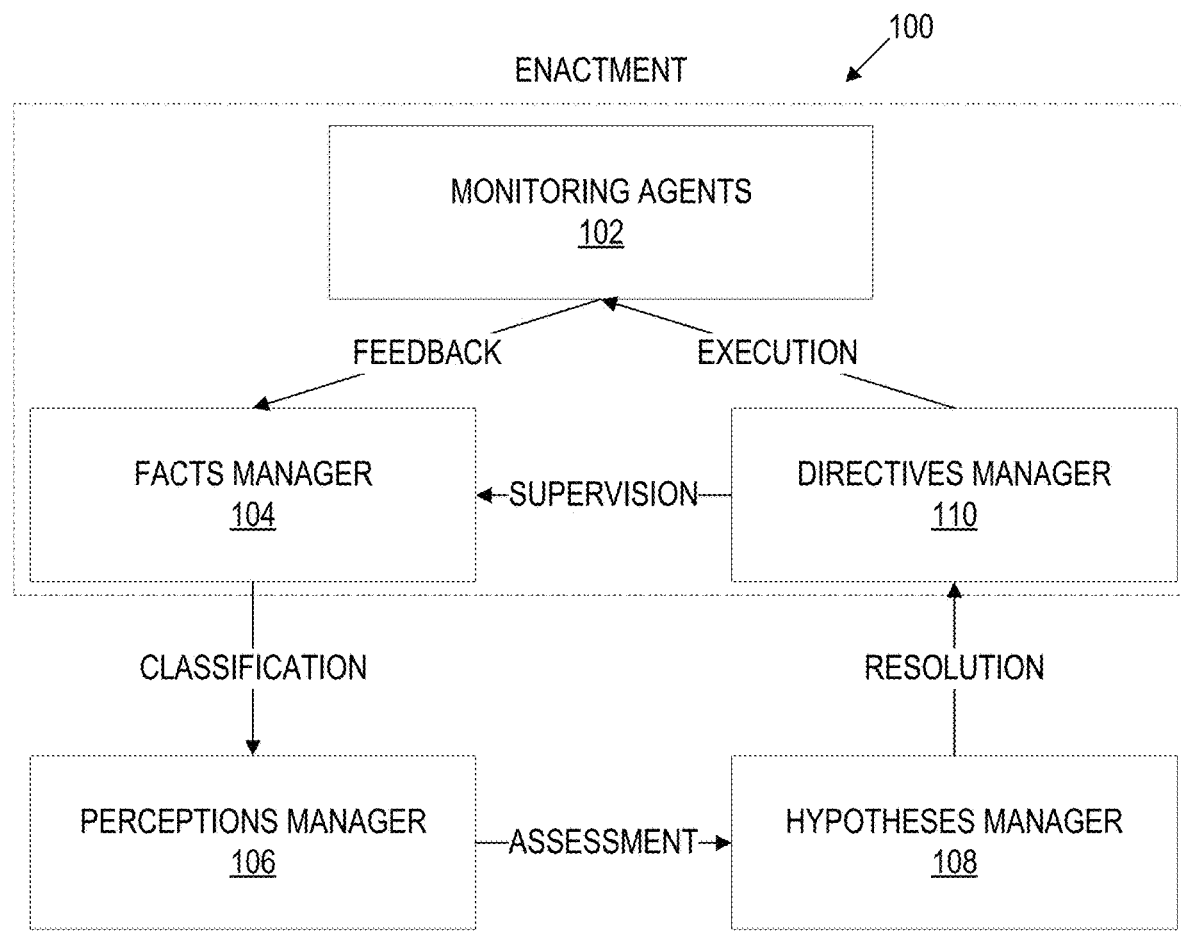
FIG. 1 illustrates an example Classification-Assessment-Resolution-Enactment (CARE) loop in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DECISION LOOP ARCHITECTURE AND SYSTEM INTEGRATION
3. TRACEBACK-ENABLED DECISION RATIONALE DATA MODEL AND CONSTRUCTION
4. QUERYING RATIONALE DATA STRUCTURES
5. RECORDED EXPLANATIONS AND MACHINE-LEARNING APPLICATIONS
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

Techniques are described herein relating to traceback decision rationales in machine-learning (ML)-based ontologies including ontologies that leverage ML processes as a decision support aid for humans-in-the-loop. The techniques may be used in post-event analysis to reconstruct decision rationales that identify what information was presented via ML to humans-in-the-loop and what information led to the decision sequence that resulted in a successful or catastrophic outcome. The techniques may further be used to determine whether alternative rationales and/or criteria were considered by the ML model, why the alternative rationales and/or criteria were not selected, and whether the outcome was caused by human operator error or an automated process. Thus, the techniques may provide a retrospective interpretation for the functioning of an ML-based ontology.

In some embodiments, the techniques include generating a record of a decision sequence leading to an outcome in a manner that is backward and/or forward trackable. Users may submit queries against the record for explanations of a particular outcome, including direct queries ("Why did an outcome occur?"), counterfactual queries ("Why not X?") and contrastive queries ("Why was X not considered?"). Additionally or alternatively, queries may be submitted against the record to explore explanations in greater depth and varying levels of granularity guided by the quantitative traceback capabilities of the ML-based ontologies described herein.

In some embodiments, the record of a decision sequence includes a set of one or more decision rationales. A decision rationale may be generated as a function of traces, log records, and/or other metadata produced by one or more ML processes. The decision rationales may be stored and queried by subsequent users seeking rigorous explanations for purposes of propagating systems engineering designs that support optimal situation awareness (SA) for human-in-the-loop supervisory control and for learning from failures to avoid similar events or catastrophes in future generations of human-controlled complex engineering systems. When a query to explain an outcome is received, a set of one or more decision rationales satisfying the query may be identified. A query response may then be generated and returned based at least in part on the set of one or more decision rationales. The response may include answers and/or reasons to one or more direct questions, counterfactual questions, and/or contrastive questions.

In some embodiments, the decision rationales may be used to determine whether a particular outcome was caused by human operator error or one or more parameters associated with a machine-learning model. The decision rationales may be analyzed to determine the outputs and decisions of a ML model, if any, associated with the situation. A human operator error may be involved in various scenarios such as:
  The output of the ML model did not include any alarms and/or other alert signals, and a human operator unnecessarily performs an accident-avoidance action and/or unnecessarily shutdowns an asset and/or process that was not induced by guidance from the ML processes;
  The output of the ML model generated an alarm for one or more monitored traces, and a human operator did not perform evasive or mitigating actions; and/or
  The output of the ML model generated an alarm for one or more monitored traces, and a human operator performed a wrong evasive or mitigating action.

In some embodiments, the runtime generation of decision rationales is agnostic to the internal architectural features of the ML algorithm. One advantage of separating concerns is that the explainability and the overall explanation framework is independent of the sources of the decision rationales. Thus, the ML algorithms may be updated and/or otherwise modified without requiring changes to the explanation framework.

One or more embodiments described in this Specification and/or recited in the claims may not be included in this General Overview section.

2. Decision Loop Architecture and System Integration

In some embodiments, the techniques described herein are used to explain and optimize artificial intelligence (AI) driven human-in-the-loop supervisory control systems. An AI-driven human-in-the-loop supervisory control system may include a set of one or more ML models that guide a decision-making process associated with operating or applying a complex system. The output of the model may be used to automate some decisions and/or enhance a user's ability to make informed decision. In the context of an aviation system, for instance, ML models may be deployed to analyze patterns in various relevant metrics, such as altitude, airspeed, rate of climb or descent, pitch, yaw, roll, and/or other attributes. The AI-driven system may recommend and/or automate certain actions based on learned correlations and/or other patterns associated with the metrics. As an example, the system may recommend or automate a change in airspeed, pitch, yaw, or roll to avoid a sudden stall. The AI-driven system may detect and expose patterns to guide actions in a manner that would not be feasible for the pilot to perform in real-time given the vast amount of signals the system generates. The AI-driven system may be used for guiding decisions with respect to assets other than aircraft including bridges, manufacturing plants, nuclear power plants, and server systems.

The AI-driven system may include a closed-loop deep learning architecture to guide a decision-making process. An example of a closed-loop deep learning system is the Classification-Assessment-Resolution-Enactment (CARE) loop. FIG. 1 illustrates CARE loop 100 in accordance with some embodiments. CARE loop 100 comprises a set of nodes, including monitoring agents 102, facts manager 104, perceptions manager 106, hypotheses manager 108, and directives manager 110. Each node may correspond to one or more processes and/or hardware components that receives input from one or more other nodes and generates an output. The nodes may be interconnected to form a closed loop. In other embodiments, CARE loop 100 may include more or fewer components than the nodes illustrated in FIG. 1. Nodes illustrated in FIG. 1 may be executed by components that are local to or remote from each other. The nodes illustrated in FIG. 1 may be implemented in software and/or hardware. Each node may be distributed over multiple applications and/or machines. Multiple nodes may be combined into one application and/or machine. Operations described with respect to one node may instead be performed by another node.

In some embodiments, the loop architecture includes monitoring agents 102 that collect raw data from the outside world. Monitoring agents 102 may include devices, modules, or subsystems that capture metrics relevant to an asset. Example monitoring agents 102 may include sensors, actuators, embedded controllers, and/or other mechanisms. Monitoring agents 102 may generate time-series signals, also referred to herein as monitored traces, that include sample values for various attributes of an asset. For instance, a computing system may include sensors that measure central processing unit (CPU) utilization, CPU temperature, memory throughput, input/output (I/O) operations per second, network latency, storage consumption, and/or other metric values. As another example, a nuclear reactor may include sensors that measure core damage frequency (CDF), large early release frequency (LERF), residual heat removal, power changes, and/or other metric values. The metric values and other time-series data that are captured by a monitored trace may vary from implementation to implementation.

In some embodiments, the raw sensor data output by monitoring agents 102 serves as input to facts manager 104. One or more trained ML models may be applied to classify the facts. The trained models may be deterministic in nature, such as the Multivariate State Estimation Technique (MSET) described in U.S. Pat. No. 5,764,509, titled "Industrial Process Surveillance System", previously incorporated by reference. Additionally or alternatively, other trained ML models may be applied to classify facts into perceptions. Other example ML models may include decision trees, support vector machines, and auto-associative memory models including auto-associative neural networks, auto-associative kernel regression, and auto-associative MSET. The trained ML model(s) may transform the facts into a perception based on learned patterns in the raw sensor data, such as correlation patterns between different sensor signals and patterns within individual signals themselves. A perception may represent an estimate of the current health of an asset, subsystem of an asset, or individual component therein. For example, an ML model may be applied to a set of input facts to generate an output that indicates whether a target resource is operating normally or experiencing a problem. The ML model may output of alarm, also referred to herein as an alert signal, if the monitored traces exhibit anomalous behavior indicative of a problem that is predicted to benefit from human assessment. The ML model may prioritize which anomalous problems are brought to the attention of the human user to minimize cognitive overload and reduce false alarms.

In some embodiments, the classified facts representing perceptions serve as input to perceptions manager 106. Although not illustrated, facts may also server as input to perceptions manager 106. Perceptions manager 106 may apply one or more trained ML models to transform the input perceptions and/or facts to hypotheses. Example ML models for assessing perceptions to generate hypotheses may include a Bayesian belief network, a least-squares optimization model, a regression of solutions model, and an MSET sequential probability tests (MSET-SPRT) model. Hypotheses represent predictions of the causes contributing to or explaining one or more facts or perceptions. For example, if CPU performance is degrading unexpectedly, a corresponding hypothesis may predict the likelihood that a particular component is contributing to the degradation. Thus, a set of hypotheses may provide possible causes that explain a perceived situation. A set of hypotheses may include alternative hypotheses corresponding to different possible explanations for a perceived situation.

In some embodiments, the assessed perceptions representing hypotheses serve as input to hypotheses manager 108. Additionally or alternatively, facts and/or perceptions may serve as input to hypotheses manager 108. Hypotheses manager 108 may apply one or more trained ML models to transform the input hypotheses, perceptions, and/or facts to generate directives. Example ML models for predicting directives for a given set of hypotheses, perceptions, and/or facts may include a Bayesian belief network with decision and payoff/cost nodes, also referred to as Influence Diagrams, Dempster-Shaffer models, decision trees, and prognosis of remaining useful life models. Directives represent actions that are predicted to address, ameliorate, or otherwise resolve a perceived situation. For example, if CPU performance is assessed to be degrading because of a software component, then a directive may predict that a patch of the software resource may help resolve the situation. The directives that are generated may vary depending on the perceptions, hypotheses, and training of the applied ML models. A set of directives may further include alternative actions that are predicted as potential resolutions to a perceived situation. An ML model may assign probabilities to each action based on the predicted likelihood that it resolves a situation.

In some embodiments, the predicted resolutions serve as input to directives manager 110. Facts, directives, and/or hypotheses may also serve as input to directives manager 110. Directive manager 110 may transform directives into actions in the outside world. Directive manager 110 may apply control structures, which may be encoded in scripts, plans, workflows, processes, and/or other executable code. In some cases, the enactment of a directive may be contingent on the capturing of new facts, and fact manager 104 may be notified to monitor for the collection of additional facts in a timely manner. A set of directives may dictate when anomalous behavior should be addresses through automated channels, ignored, or brought to the attention of a human operator, such as through an alert signal.

In some embodiments, enacting a directive affects the environment, which may or may not resolve a situation. If a single cycle through the loop illustrated in FIG. 1 is insufficient to reach a definitive decision, then the cycle may be repeated to obtain additional information until the final decision is reached. For example, if a directive is enacted, then additional facts may be gathered to determine if the perceived situation has improved or worsened. Based on the newly received facts, the classification step may determine if there are any actionable perceptions to be created or updated. If new perceptions are created or updated, then the set of hypotheses and/or directives may also be updated with additions and/or changes. Thus, the decision making may be a cyclic process in which a decision is progressively reached by a series of analysis steps.

In some embodiments, directive manager 110 determines whether to involve a human or not to enact an action. To avoid cognitive overload, directive manager 110 may limit the involvement of human operators to specific scenarios, which may be determined by the control structures previously mentioned. For instance, the ML models may assign a risk or opportunity rating to perceived situations, hypotheses and/or directives. Directive manager 110 may then involve a human operator only in scenarios where the severity of a perceived situation has been classified as severe or high risk, where the severity is determined as a function of the assigned risk and/or opportunity rating. Directive manager 110 may present a set of one or more recommended actions to a human operator in a compact, qualitative language to allow for quick assessment and decision-making by the human operator. If the severity is less than a threshold, then directive manager 110 may enact an action without any human supervision.

Figure 2:
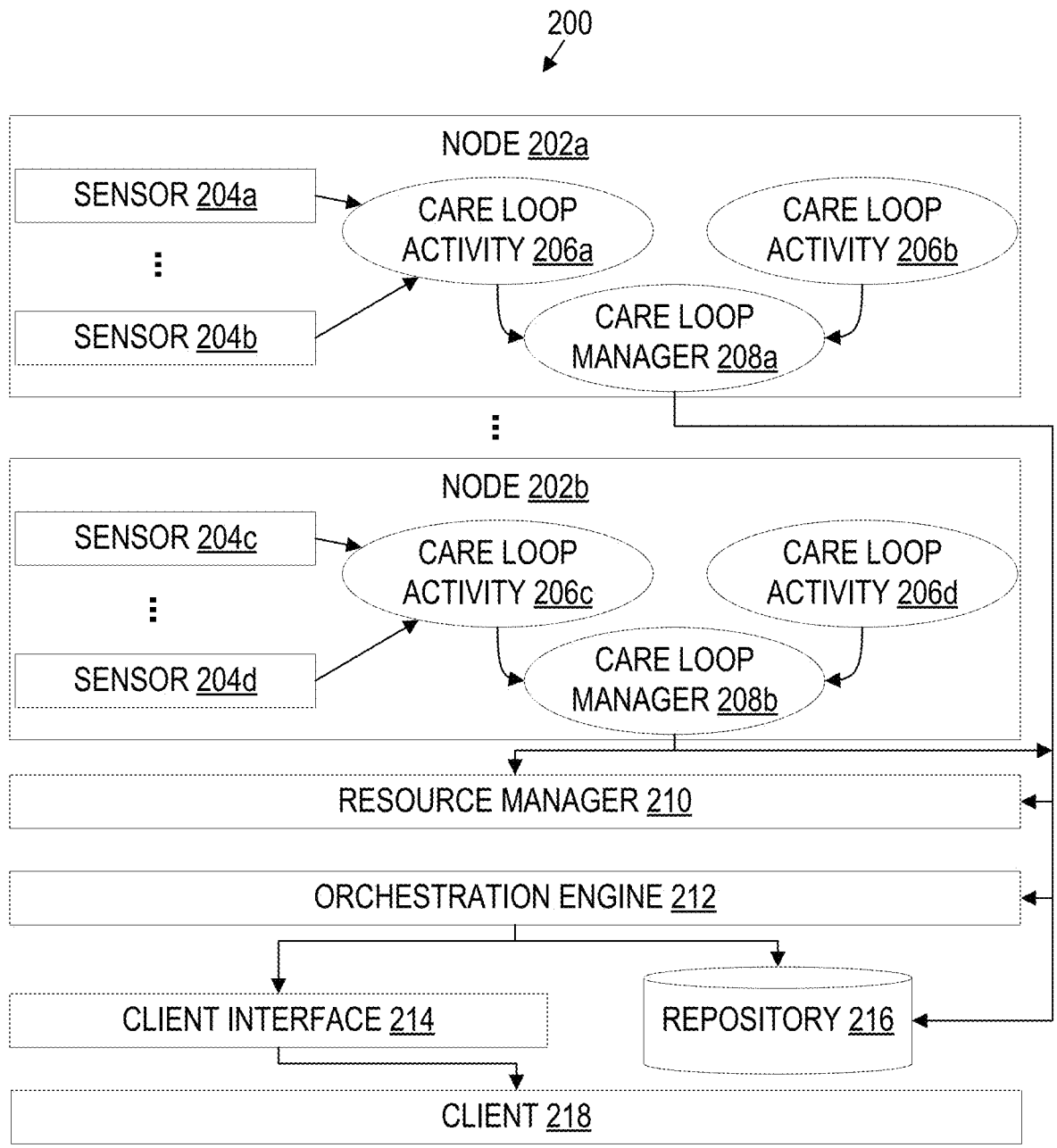
FIG. 2 illustrates an example system for orchestrating a deep learning architecture that integrates the execution of multiple decision-making loops in accordance with some embodiments.

In some embodiments, a system may integrate multiple AI-powered decision loops at varying levels of granularity. FIG. 2 illustrates an example system for orchestrating a deep learning architecture that integrates the execution of multiple decision-making loops in accordance with some embodiments. System 200 may include more or fewer components than illustrated in FIG. 2. Components illustrated in FIG. 2 may be executed by components that are local to or remote from each other. The components illustrated in FIG. 2 may be implemented in software and/or hardware. Each component or node may be distributed over multiple applications and/or machines. Multiple nodes may be combined into one application and/or machine. Operations described with respect to one node may instead be performed by another node.

System 200 includes a plurality of nodes, such as node 202a-b. A node may correspond to an asset, subsystem, component, and/or other resource that are subject to decision-making processes and control systems. The plurality of nodes may be associated with a hierarchical relationship, which may be defined within a system topology. For example, a parent node may correspond to a self-driving automobile with a human supervisor. Children nodes may include various subsystems, such as a braking subsystem, steering subsystem, engine subsystem, etc. Other assets, such as aircraft and nuclear power plants, may have different nodes and subsystems. Each of the subsystem nodes may have their own children representing other components of the subsystem that are subject to decision-making loops.

Sensors 204a-d may include devices, modules, or subsystems that capture metrics relevant to the health, performance, and/or other attributes of a node. Although only two sensors and nodes are illustrated in FIG. 2, the number of nodes and sensors-per-node may vary depending on the particular implementation. As previously noted, the metric values and other time-series data that are captured by the sensors may vary from implementation to implementation.

In some embodiments, sensors 204a-d provide input observations to a set of CARE loops, triggering CARE loop activity 206a-d. CARE loop activity 206a-d may execute in parallel on different nodes to coordinate various supervised and/or unsupervised decisions within the system. For instance, various CARE loops in a self-driving automobile may control decisions regarding when and how to apply braking, acceleration, steering, and/or control mechanisms. In other systems and subsystems, the decisions that are made through CARE loop activity 206a-d may differ. Nodes 202a-b may include traces that produce log records and/or other metadata that tracks CARE loop activity 206a-d.

In some embodiments, the decisions made through the activity of one or more CARE loops may serve as input to one or more other CARE loops. For example, a decision to enact an action within a subsystem may be fed as input to another CARE loop, which may affect the decision-making activity within the loop. Each node may include a CARE loop manager, such as CARE loop manager 208a-b, to coordinate execution of the CARE loop activity within the node.

In some embodiments, resource manager 210 manages resources within system 200. For example, resource manager 210 may instantiate CARE loop managers in each node. Once instantiated, CARE loop manager 208a-b may manage CARE loop activity within the node, as previously mentioned, and report decisions to resource manager 210. Additionally or alternatively, resource manager 210 may enact directives based on the reported CARE loop activity. For example, resource manager 210 may invoke or control a node's access to certain control systems to enact actions, such as applying patches, bringing a subsystem offline or online, and sending control signals to system components.

In some embodiments, orchestration engine 212 monitors the status of each CARE loop within system 200. CARE loop manager 208a-b and CARE loop activities 206a-d may provide orchestration engine 212 with trace data and metadata including perceptions, hypotheses, and directives. Orchestration engine 212 may add links to the data to generate rationale data structures that identify what CARE loop activity led to a particular outcome.

In some embodiments, components of system 200, such as CARE loop manager 208a-b and CARE loop activities 206a-d, store data within data repository 216. Data repository 216 may be any type of storage unit and/or device (e.g., a file system, database, collection of tables, or any other storage mechanism) for storing data. Further, data repository 216 may include multiple different storage units and/or devices. The multiple different storage units and/or devices may or may not be of the same type or located at the same physical site. Further, data repository 216 may be implemented or may execute on the same computing system as one or more other components of system 200. Alternatively or additionally, data repository 216 may be implemented or executed on a computing system separate from one or more components of system 200. Data repository 216 may be communicatively coupled to other system components via a direct connection and/or via a network.

In some embodiments, data repository 216 includes a bitemporal (or multitemporal) database. A bitemporal database may facilitate handling of CARE loop activity along multiple timelines by allowing system 200 to rewind the CARE loop activity to the data as it was recorded to the most accurate data currently known. Bitemporal modeling may further store timestamps identifying when CARE loop data was changed, if at all, and data indicating a reason for the change.

Client 218 may access components of system 200, such as orchestration engine 212, through client interface 214. A "client" in this context may be a human user, such as an administrator, a client program, or some other application interface. A client may execute locally on the same host one or more other components or may execute on a different machine. If executing on a different machine, the client may communicate according to a client-server model, such as by submitting Hypertext Transfer Protocol (HTTP) requests invoking one or more of the services and receiving HTTP responses comprising results generated by one or more of the services.

Client interface 214 provides a user interface for interacting with system 200. For example, client interface 214 may include a graphical user interface (GUI), an application programming interface (API), a command-line interface (CLI) or some other interface through which client 218 may submit requests and/or receive data. In some embodiments, client interface 214 provides an interface through which client 218 may submit queries against the CARE loop trace data and metadata to determine the rationales leading to a particular outcome. Techniques for querying the data are described further in Section 4, titled "Querying Rationale Data Structures."

Client interface 214 may provide various user interface elements to facilitate the formation, editing, and/or submission of queries as well as viewing, navigating, and/or otherwise processing query responses. Client 218 may render user interface element items provided through client interface 214. For example, a client may be a browser, mobile app, or application frontend that displays user interface elements for submitting queries and navigating query responses. Examples of user interface elements include checkboxes, radio buttons, dropdown lists, list boxes, buttons, toggles, text fields, date and time selectors, command lines, sliders, pages, and forms.

Components of system 200 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, one or more components of system 200 are exposed through a cloud service or a microservice. A cloud service may support multiple tenants, also referred to as subscribing entities. A tenant may correspond to a corporation, organization, enterprise or other entity that accesses a shared computing resource. Different tenants may be managed independently even though sharing computing resources. For example, different tenants may have different account identifiers, access credentials, identity and access management (IAM) policies, and configuration settings. Additional embodiments and/or examples relating to computer networks and microservice applications are described below in Section 6, titled "Computer Networks and Cloud Networks," and Section 7, titled "Microservice Applications."

3. Traceback-Enabled Decision Rationale Data Model and Construction

In some embodiments, system 200 generates rationale data structures with traceback capabilities. The rationale data structures may be used to determine the sequence of decisions in a human-in-the-loop, machine-learning guided process that leads to an outcome, whether successful or catastrophic, including the logic behind the decisions, how a human was guided by machine-learning processes, what decisions the human made with respect to the guidance, and how the human decisions and output of the machine-learning models affected the final outcome. The rationale data structure may include links that allow systems and users to navigate backwards in time from the outcome to analyze CARE loop activity at varying levels of granularity including CARE loop activity executing on different nodes. The rationale data structures may further capture alternative proposals, hypotheses, and directives that were analyzed and the reasons that the alternatives were not implemented.

Figure 3:
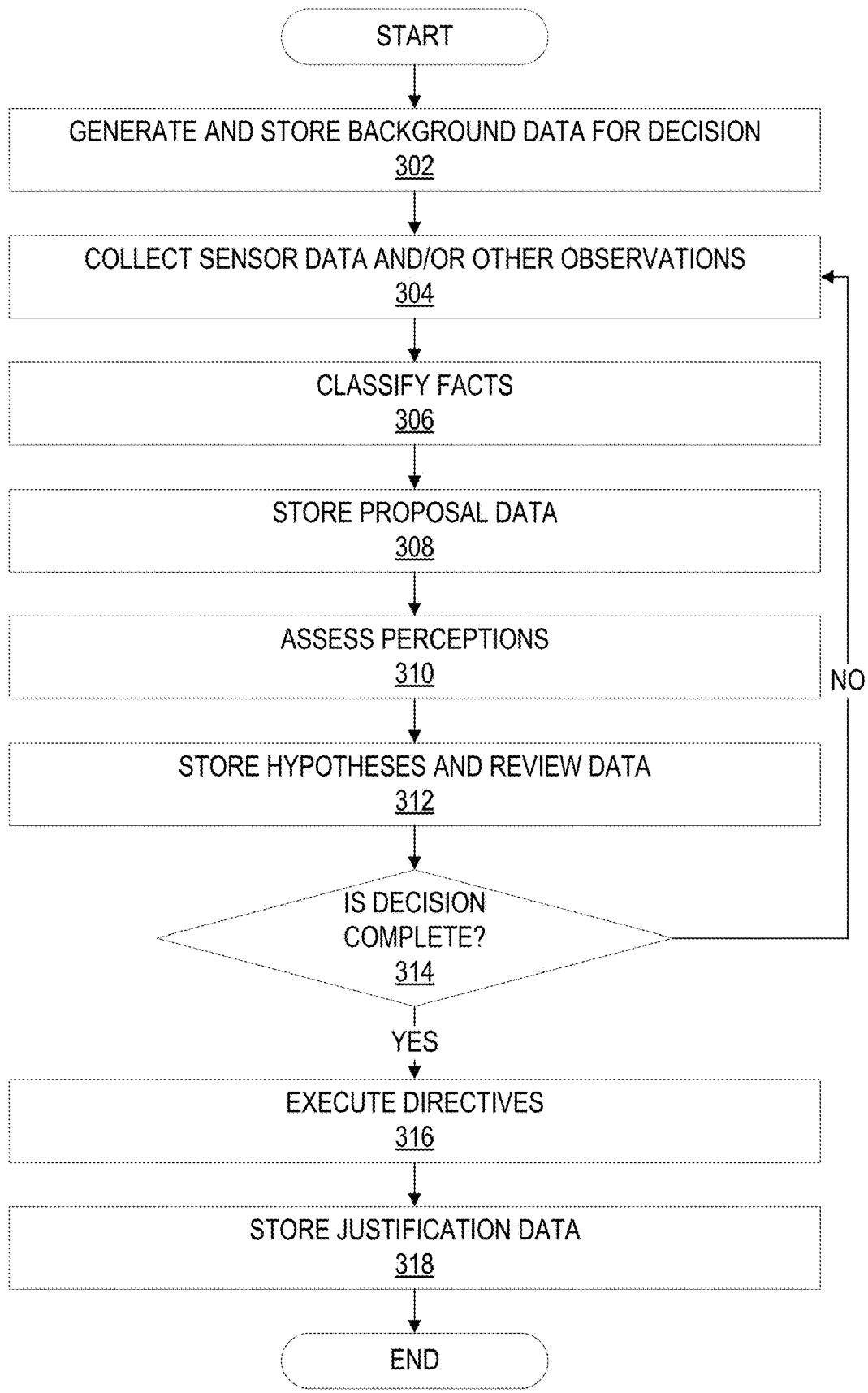
FIG. 3 illustrates a set of operations for generating decisions and trace-back enabled rationales in accordance with some embodiments.

FIG. 3 illustrates a set of operations for generating decisions and trace-back enabled rationales in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

Referring to FIG. 3, the process includes generating and storing background data for a decision (operation 302). In some embodiments, the background data may include a set of one or more goals for making decisions. A goal may identify a desired system state or performance. For example, a goal may be to maintain CPU utilization below 90% within a server appliance. ML processes may make decisions to manage and allocate resources to satisfy the goal.

Additionally or alternatively, the background data may include a set of criteria to guide the decision-making processes. Criteria may define parameters, including rules and conditions, for making decisions. For instance, a criterion may specify a regulatory rule for operating a particular asset. The ML processes may avoid automating or recommending actions that violate the regulatory constraints and may otherwise conduct CARE loop activity in a manner that satisfies the specified criteria.

Additionally or alternatively, the background data may include context data to guide decisions. Context data may include external inputs that affect CARE loop activity. For example, context data may include scientific principles and/or formulas that affect the output of an ML model within a CARE loop. Other context data may include signals from external sources external to system 200, such as recent events or other data that establishes a background context for the decision-making processes.

Once the background data has been established, the process collects sensor data and/or other observations (operation 304). As previously mentioned, a decision-making loop may receive sensor measurements from multiple sources. Additionally or alternatively, a decision-making loop may receive other inputs, such the actions, if any, enacted as a result of another decision-making loop and the outcome of the actions.

The process further classifies facts to derive a set of perceptions (operation 306). In some embodiments, facts are classified by applying a trained ML model, such as an auto-associative MSET model, to the set of input facts. In other embodiments, a human supervisor may override the classification or otherwise assign a classification to the set of input facts. A perception may represent a compact interpretation of a set of facts that allow an end user to quickly gain insights into characteristics of an evolving situation. For instance, a perception may be a statement of a problem that was encountered. In this case, a perception may correspond to a proposal that potentially requires action to address. The other steps in the decision-making loop may determine whether or not to enact a directive to address the problem.

The process next stores proposal data that includes perceptions obtained through classifying the facts (operation 308). For example, a proposal may include a statement of a perceived problem. Additionally or alternatively, a proposal may include a proposed action to address the problem. The proposal data may indicate whether it was generated by a human user or by an ML model. In the latter case, the proposal data may indicate the ML model parameters that were applied to the input facts to generate the proposal.

In some embodiments, the process assesses the perceptions to derive a set of hypotheses (operation 310). The perceptions may be classified by applying a trained ML model, such as MSET-SPRT, to a set of perceptions. In other embodiments, a human supervisor may override an assessment or otherwise manually assess a set of perceptions. A hypothesis may represent a proposed explanation for a perceived situation, such as the underlying cause of a problem or set of problems.

The process further stores hypotheses and review data obtained through assessing the perceptions (operation 312). For example, the review data may include a statement indicating a hypothetical reason for a detected problem within system 200. The review data may indicate whether it was generated by a human user or by an ML model. In the latter case, the review data may indicate the ML model parameters that were applied to the input perceptions to generate the hypotheses.

In some embodiments, the process determines whether the decision is complete (operation 314). A directive may be generated as a function of the hypotheses, proposals, and/or facts. A directive may fully address a perceived situation or may only partially address the problem. A directive may include a plan for gathering additional facts rather than directly resolving the situation or explicitly indicate that the issue will not be addressed and will be closed. If more observations are to be gathered, then the process returns to operation 304 to continue the decision-making process including generating corresponding trace data.

Once the decision is complete, the process executes the corresponding directives, if any (operation 316). As previously mentioned, executing a directive may include executing one or more actions, such as sending control signals, applying patches, etc. The actions may be fully automated in some circumstances. In other cases, a directive may involve presenting an alert and/or recommendation to a human-in-the-loop. The human may then determine whether to enact the recommended action, ignore the action or alert, or pursue another action to address a perceived situation.

The process further stores a justification for the executed directives (operation 318). The justification may link the ML model outputs including the perceptions, hypotheses, and recommended directives to the enacted directives. The justification may indicate whether the ML models triggered any alerts, including any recommended actions, and if a human-in-the-loop addressed or ignored the alerts. The justification may further indicate what ML-based automated actions were taken and what human-directed actions were taken to address a perceived problem.

Figure 4:
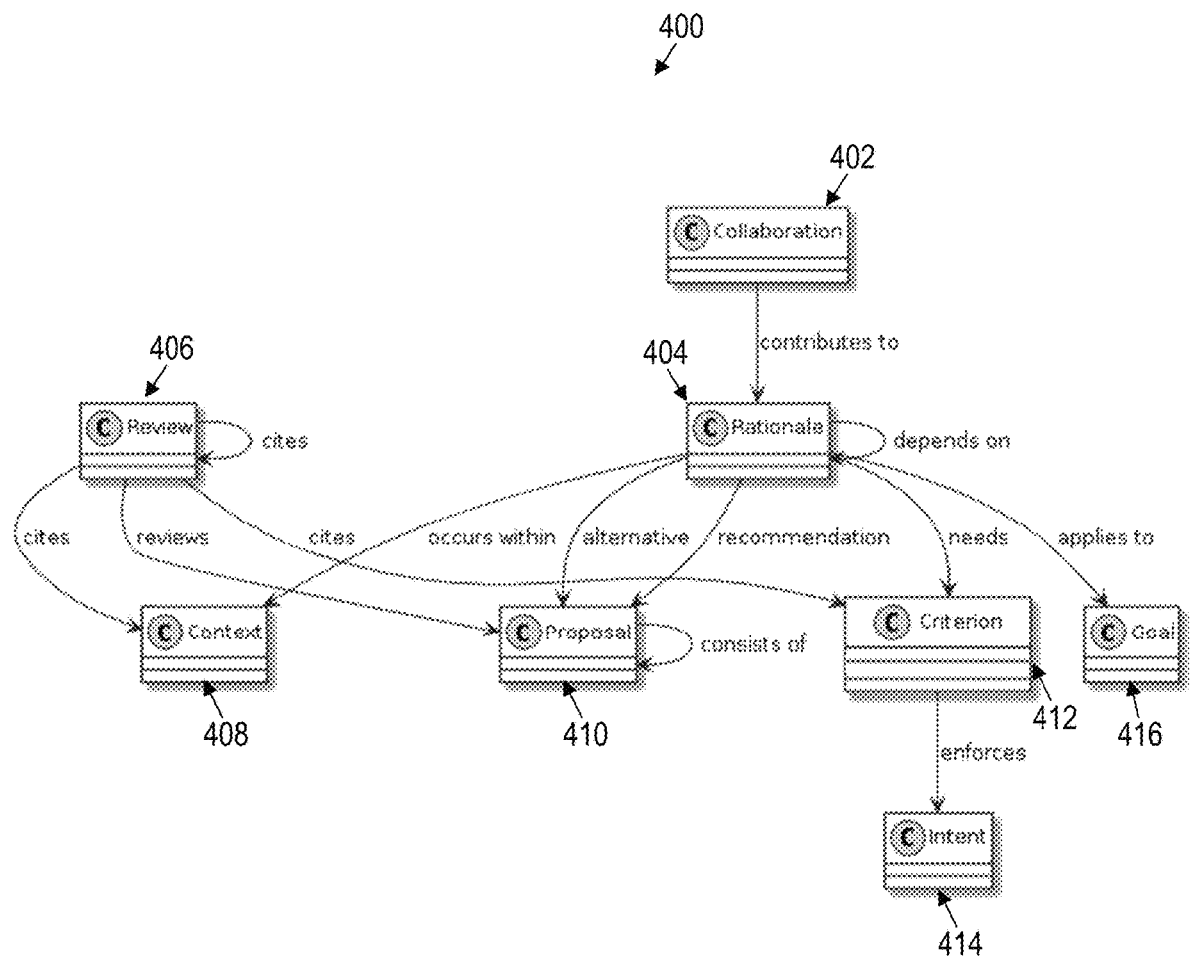
FIG. 4 illustrates a rationale data model in accordance with some embodiments.

FIG. 4 illustrates rationale data model 400 in accordance with some embodiments. Rationale data model 400 may be generated based on trace data, log records, and metadata associated with a human-in-the-loop machine-learning guided process. Rationale data model 400 includes collaboration node 402 representing a collaboration for which one or more decisions are made. The collaboration and associated sequence of decisions may result in a successful, partially successful, neutral, or unsuccessful outcome. Collaboration node 402 is linked to rationale node 404, which may represent a rationale for one or more decisions made during the machine-learning guided process. A rationale for one decision may depend on one or more rationales associated with other decisions. Thus, rationale data model 400 may define a hierarchical relationship between different decisions made during a collaboration.

Rationale node 404 is linked to context node 408, proposal node 410, criterion node 412, and goal node 416. Context node 408 stores context data, such as scientific principles and formulas, that are relevant to the decision-making process. Proposal node 410 includes recommended and alternative proposals for addressing a perceived situation. Criterion node 412 and goal node 416 include store additional background data used to guide decisions. Criterion 412 node may be linked to intent node 414 that defines intended constraints to be enforced during the decision-making process. Review node 406 includes assessments of the proposals based on the context data and specified criteria.

Figure 5:
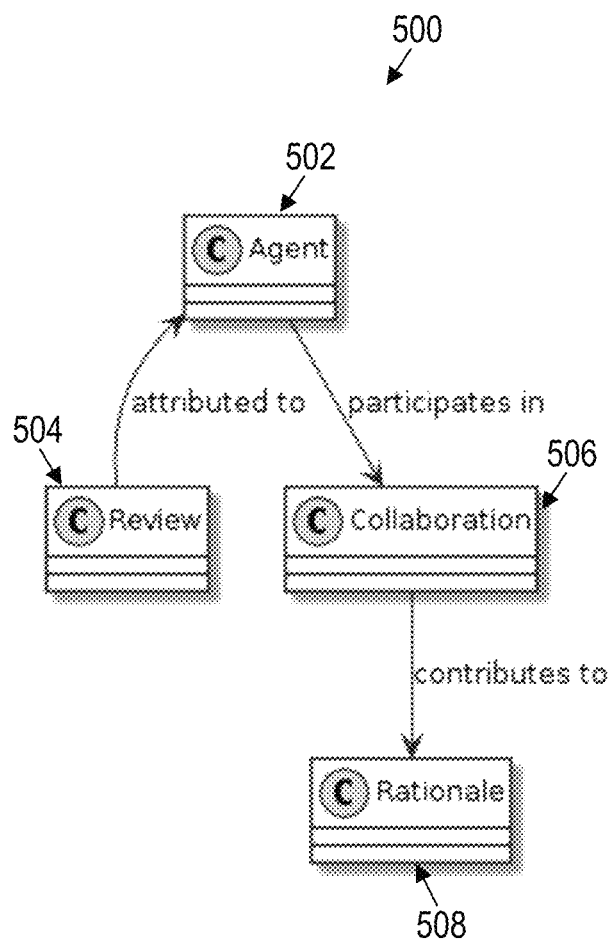
FIG. 5 illustrates an example data structure for capturing a human-in-the-loop rationale in accordance with some embodiments.

FIG. 5 illustrates example data structure 500 for capturing a human-in-the-loop rationale in accordance with some embodiments. With a human-in-the-loop ontology, a human may be involved in the decision-making process, including the classification of a situation and the assessment of proposals. In other cases, the agent may be a non-human user, such as an external application, system or service. As illustrated, agent 500 is recorded as participating in the collaboration, represented by collaboration node 506. Review node 504 is linked to agent node 502 to identify whether a particular assessment of a proposal was performed by a human user or an ML process. Agent node 502 may also identify which human user performed the assessment in a multi-user system. The attribution is traceable through rationale node 508. Thus, the record may be used to track how the contribution of an agent affected the situation outcome, if at all. For example, the decisions of an agent decisions may be tracked to determine whether they followed the ML-guidance, ignored the ML-guidance or alerts, took action even though there were no ML-generated alert signals, or took a different course of action than recommended by the ML model.

4. Querying Rationale Data Structures

The rationale data models and structures described herein allow for decision sequences to be explainable to humans with little computational overhead. System 200 may leverage the data structures to generate on-demand explanations for a particular outcome. Additionally or alternatively, the data structures may be queried to drill-down into more detail about why and how decisions were made, why alternatives were not enacted and/or considered, what decisions are attributable to a human user, and what ML-generated alerts were presented to the human user.

In some embodiments, queries for explanations of an outcome may be submitted to system 200. The queries may originate from a client application, which may be remote (e.g., a browser or web app) or local (e.g., a desktop app) to the system. In some cases, the users may be associated with a role, such as a regulatory agency, stakeholder, or system developer, which may be interested in determining how an outcome occurred to propagate good systems engineering designs that support optimal system administration for human-in-the-loop supervisory control and/or to learn from failures to be able to avoid similar events or catastrophes in future generations of human-controlled complex engineering systems. Other classes of roles may also be assigned to a user depending on the particular implementation.

In some embodiments, generating a query response includes identifying and isolating the relevant rationales. A process for executing the query may search for rationales that match the query as well as satisfying criteria, such as confidentiality conditions. Once the most relevant rationales are found, the process may generate an explanation for each of the roles and types of query. When an end user, such as an ML customer, requests the reason for a particular decision, the most relevant elements/attributes of the rationale data structure may be included/presented in the query response. For example, the end user may be shown the decision itself, the fundamental goal that was specified to be achieved, and the precise quantitative reasoning behind the recommendation. To reduce cognitive overload, lower-level technical details may be hidden from the end user. In some cases, the technical details may not be publicly available to the end user and subject to confidentiality conditions. In other cases, the end user may be given an option to drill down into the technical and more quantitative details associated with the rationale.

Figure 6:
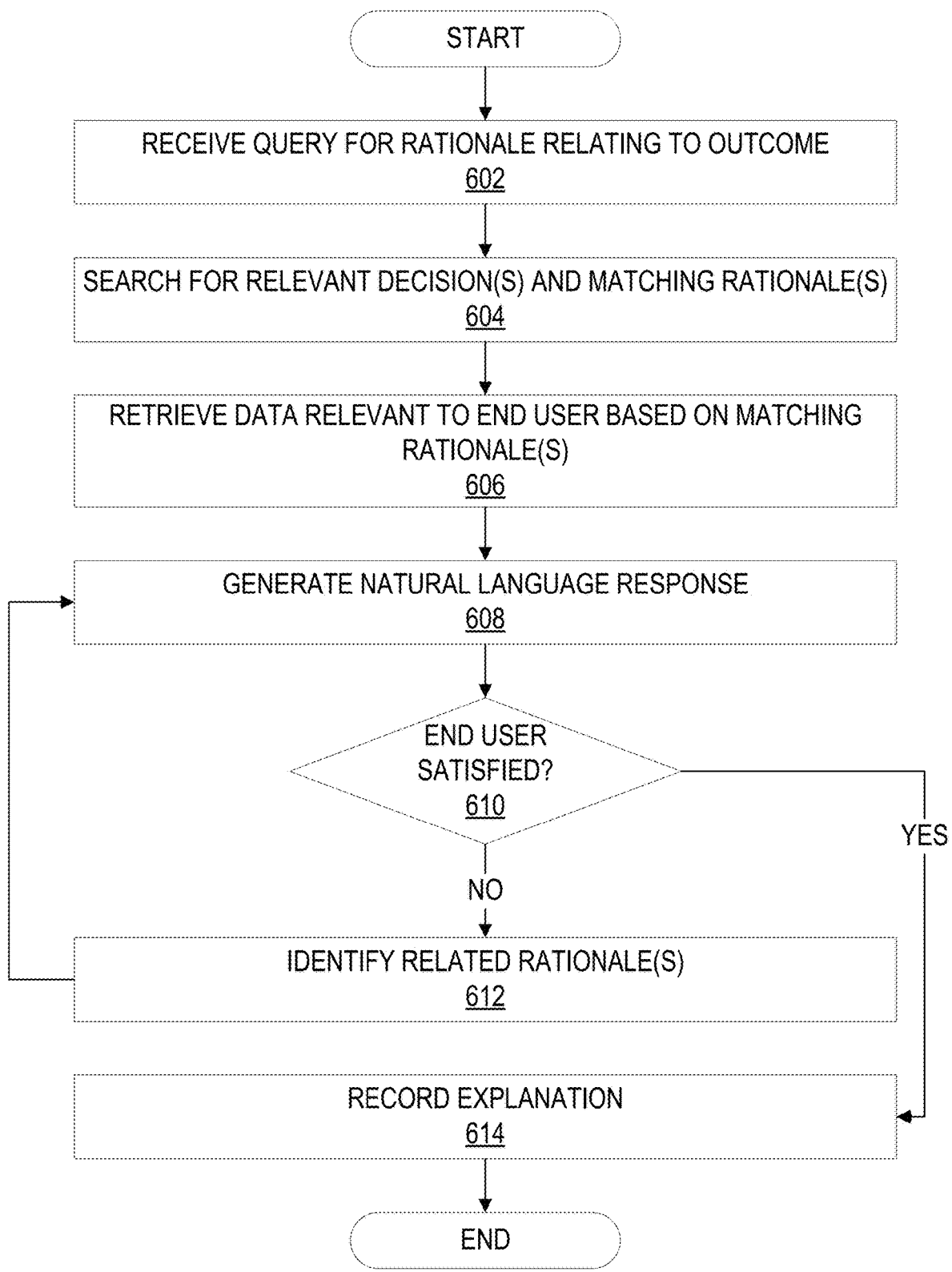
FIG. 6 illustrates a set of operations for generating explanations in response to queries in a manner that allows for different levels of details in accordance with some embodiments.

FIG. 6 illustrates a set of operations for generating explanations in response to queries in a manner that allows for different levels of details in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

Referring to FIG. 6, the set of operations includes receiving a query for a rationale relating to an outcome (operation 602). As previously noted, the query may be submitted through a web or application interface.

Responsive to receiving the query, the process searches for relevant decision(s) and matching rationale(s) (operation 604). For instance, the process may identify collaboration node 402 that is associated with a particular outcome. The process may then extract one or more rationales from rationale node 404 and identify which rationales are relevant to the particular outcome. A rationale may be determined to be relevant if it directly or indirectly contributed to the outcome.

The process further retrieves data relevant to an end user based on the matching rationale(s) (operation 606). For example, the process may retrieve the goal, recommended proposal, and/or a justification for enacting a recommended proposal. In some cases, a sequence and/or hierarchy of decisions may have led to an outcome. The process may select the relevant data for the most recent or top-level rationale or may retrieve this data for each decision in the sequence.

In some embodiments, the process generates a natural language response to the query based on the retrieved data (operation 608). The query response may include a natural language description of the goal, proposal, directive enacted, and/or justification for the enacted directive. For example, the query response may include a problem statement relative to the goal, such as "CPU utilization is above 90% for longer than a threshold timeframe". The query response may further include a hypothesis and justification for enacting a directive, such as "The number of new database sessions increased significantly in the same timeframe", and a statement describing the directive such as "New requests were routed to another server." In some embodiments, the query response may indicate what decision were made and/or actions enacted by an ML model and a human user, if any. The process may use an NLP engine to generate a natural language query response. Low-level quantitative details, such as ML model weights, statistical computations, and/or other technical details may be omitted from the initial query response. Access to these details may be restricted to protect confidentiality. If the user has appropriate system privileges, then the user may be given the option to drill down into the technical details.

In some embodiments, the process determines whether the user is satisfied with the query response (operation 610). Client interface 214 may present an option to submit additional queries and/or drill-down into the technical details behind a decision rationale.

In some cases, if the user is not satisfied with a query response, then the process identifies related rationales (operation 612). For example, the process may traverse links with rationale data model 400 to one or more rationales upon which the current rationale depends and/or to one or more related reviews. The process may return to operation 608 to present the relevant data for the next rationale in a decision hierarchy or decision sequence. If the user is still not satisfied, then the process may continue to drill down until there are no remaining decision rationales that led to the outcome.

Once the user is satisfied with a query response, then the explanation is recorded (operation 614). The explanation may include the relevant data, such as the goal, proposal, and justification returned in the query response.

Figure 7:
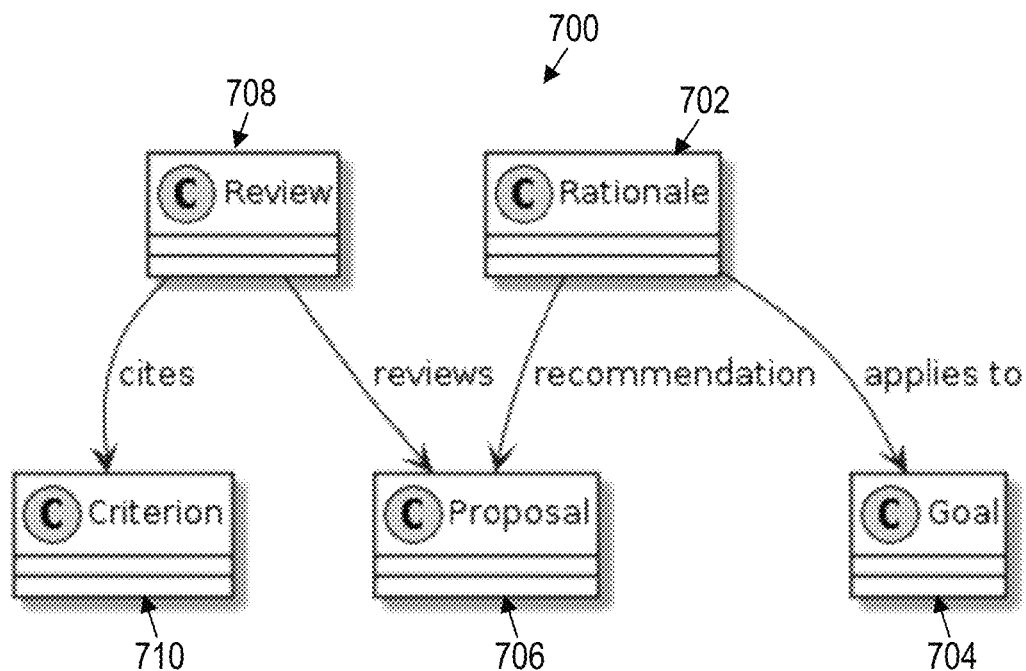
FIG. 7 illustrates a query data model in accordance with some embodiments.

FIG. 7 illustrates query data model 700 in accordance with some embodiments. Query data model 700 illustrates the relevant elements of the rationale data model that may be used to form a query response. When a query is received, the process may identify matching rationale 702 and traverse the links to identify goal 704, proposal 706, review 708, and criterion 710. Data may be extracted from the relevant attributes and used to form a natural language query response as previously described. In other embodiments, the relevant attributes in the query model may differ. For example, query model 700 may traverse the links to identify an agent and context associated with a rationale, which may be used to formulate the query response.

Figure 8:
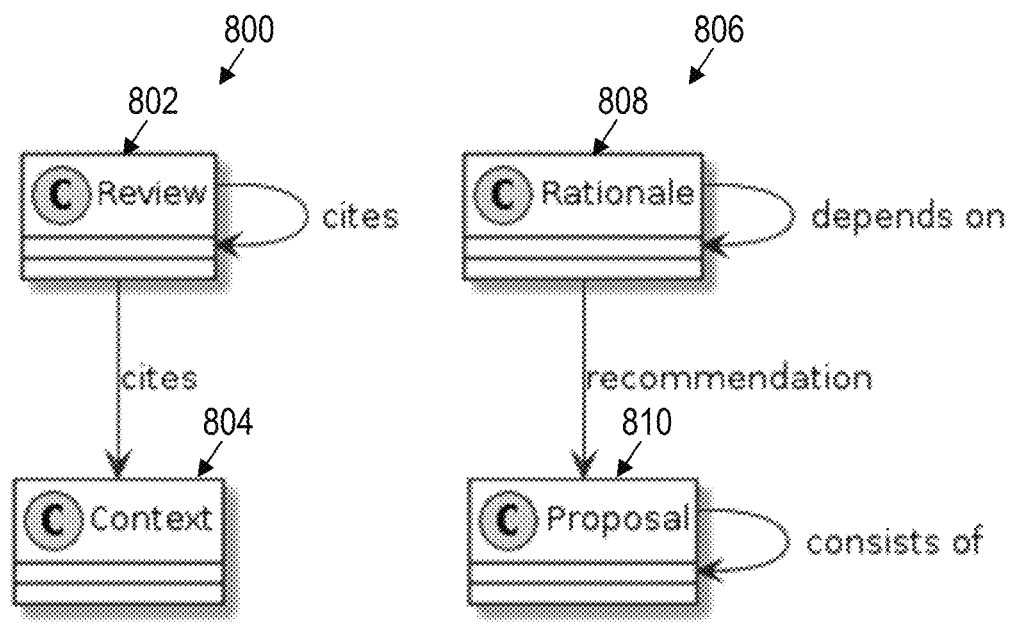
FIG. 8 illustrates follow-up query data models in accordance with some embodiments.

FIG. 8 illustrates example follow-up query data models in accordance with some embodiments. If the end user is not satisfied with the rationales-deducted explanation, then the user may submit one or more follow-up queries for further elaboration and explanation. In some embodiments, a process may systematically follow links to other reviews and/or rationales. For example, follow-up query model 800 depicts review 802, which cites other related reviews and context 804. When the follow-up query is received, the process follows the links to identify and present other justifications for the proposal. Follow-up query model 806 depicts rationale 808 which depends on other rationales and recommends proposal 810. The process may examine details about the recommendation following the "consists of" links and other rationales following the "depends on" link.

Figure 9:
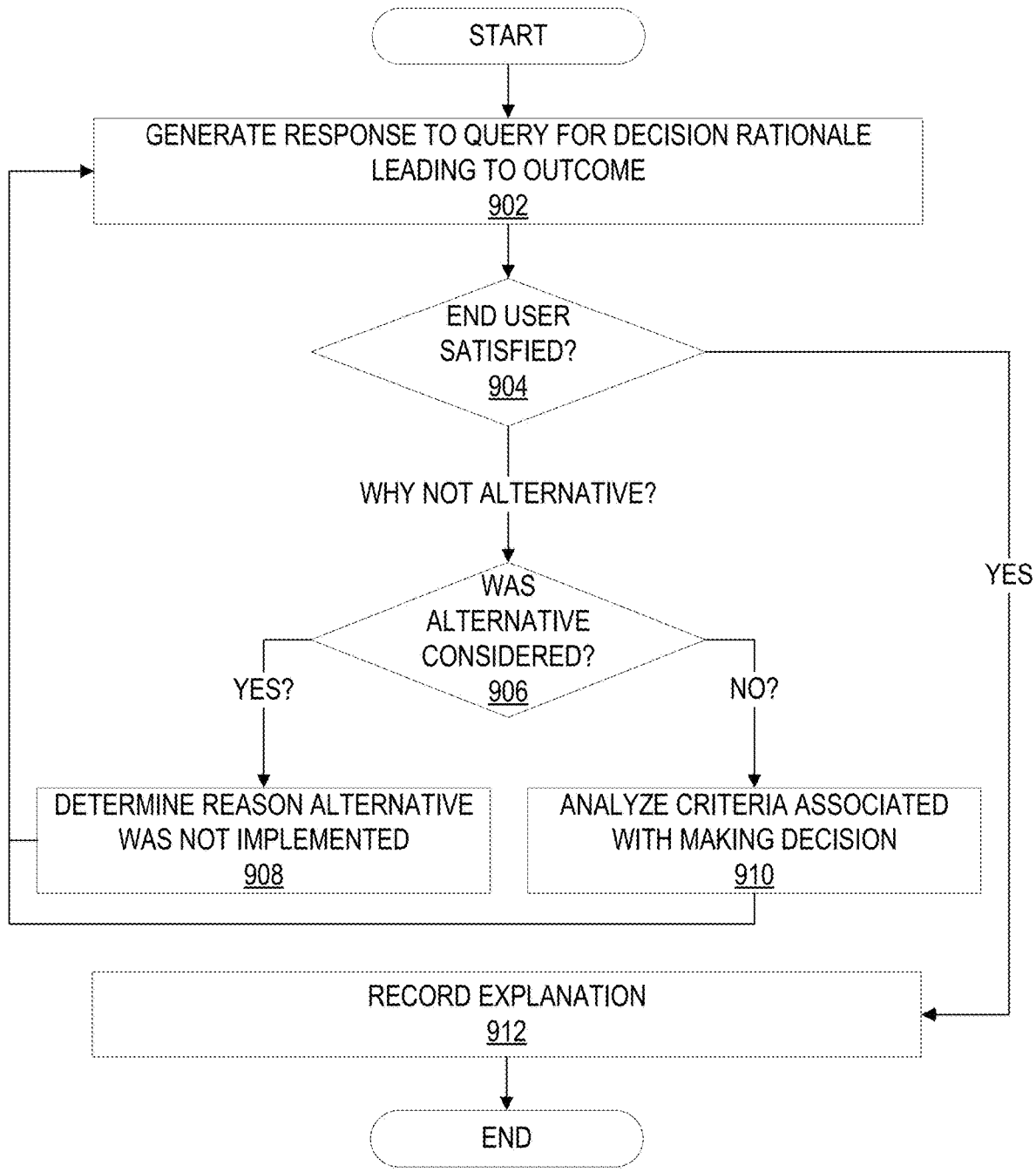
FIG. 9 illustrates a set of operations for generating contrafactual and contrastive explanations for end users in accordance with some embodiments.

The query process may further allow users to submit contrastive and contrafactual queries to examine what alternatives were considered in the decision-making process, either by ML processes and/or human users, and why alternative proposals were not implemented. FIG. 9 illustrates a set of operations for generating contrafactual and contrastive explanations for end users in accordance with some embodiments. One or more operations illustrated in FIG. 9 may be modified, rearranged, or omitted all together. Accordingly, the particular sequence of operations illustrated in FIG. 9 should not be construed as limiting the scope of one or more embodiments.

Referring to FIG. 9, the process generates a response to a query for a decision rationale leading to an outcome (operation 902). The query response may be generated in accordance with operations 608 to 610 depicted in FIG. 6.

The process next determines whether the end user is satisfied with the response (operation 904).

In some cases, if the user is not satisfied, then the user submits a query to determine whether an alternative was considered (operation 906). For example, if an application was terminated due to address poor CPU performance in a server, then a user may query whether directing traffic to another server. The alternative proposal may have been considered and rejected, enacted but did not resolve the problem, or not considered at all. The process may analyze the alternative to determine whether it was considered during the ML-guided decision-making process and, if so, whether a human-in-the-loop assessed the proposal.

If the alternative was considered, then the process determines a reason the alternative was not implemented (operation 908). For example, the process may determine whether the alternative was presented to an end user and whether the end user pursued a different course of action. Additionally or alternatively, the process may determine how an ML model assessed a proposal and why the ML model did not enact the proposal. In some cases, the ML model may have estimated that the proposal was less likely to achieve a goal than the enacted proposal or violated a criterion. The process may analyze the quantitative outputs of MSET-SPRT and derive the inputs since MSET uses deterministic modelling to generate estimates. Thus, the reason a proposal was not selected or enacted by an ML model may be determined through a traceback of the decision-making process. The process may then return to operation 902 to generate a natural language response identifying the rationale why the alternative was not enacted (or if enacted, why it did not resolve a problem).

If the alternative was not considered, then the process analyzes the criteria associated with making the decision (operation 910). If the alternative does not satisfy one or more parameters for making a decision, then the process may identify the precise criterion or criteria that were violated in a query response. If a reason why the alternative was not considered is not discernable, then the query response may also generate a corresponding query response.

The end user may submit additional contrafactual and counterfactual queries to system 200. Once the end user is satisfied, the process records the explanation (operation 912).

Figure 10:
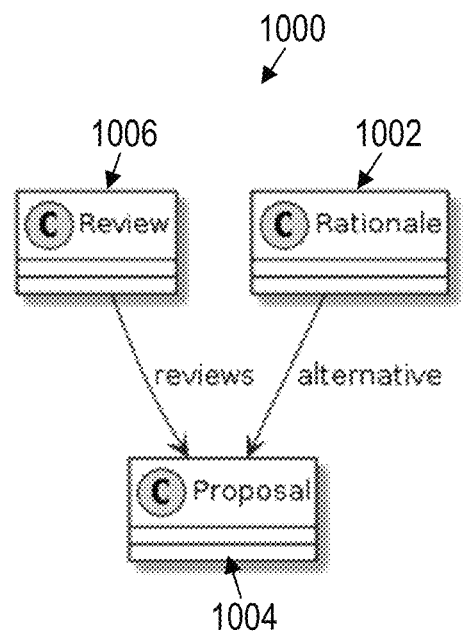
FIG. 10 illustrates a counterfactual query structure in accordance with some embodiments.

FIG. 10 illustrates counterfactual query structure 1000 in accordance with some embodiments. As previously indicated, a counterfactual explanation may provide reasons why a particular proposal did not affect the outcome in a situation (e.g., "Why not X?"). The query process may traverse the "alternative" links to rationale 1002 to determine which alternative proposals were considered, such as proposal 1004. The process may then traverse the link to review node 1006 to determine how the proposal was assessed and why it was not enacted. If a human-in-the-loop was involved in the assessment, then the process may traverse a link from review node 1006 to an agent node to determine which user assessed the proposal. The information may be extracted and used to generate a natural language query response.

Figure 11:
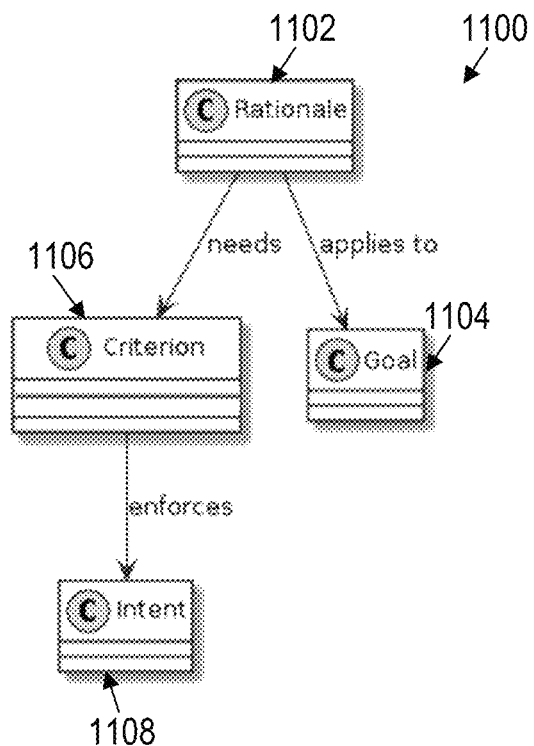
FIG. 11 illustrates a contrastive query structure in accordance with some embodiments.

FIG. 11 illustrates contrastive query structure 1100 in accordance with some embodiments. A contrastive explanation may provide reasons why a particular proposal was not considered by the ML-guided decision-making processes (e.g., "Why was X not considered?"). The query process may traverse the "applies to" and "needs" links to goal node 1104 and criterion node 1106, respectively. The process may further traverse the "enforces" link from criterion node to intent node 1108. The process may analyze the data in these nodes to determine whether the alternative contravenes a criterion, intent, or goal of the decision-making process. If so, then the query response may present the violation as a reason why the alternative was not assessed and enacted.

In some embodiments, the queries may be performed to determine how the ML outputs affected system administration, if at all, and whether human operator error occurred. For example, the query response may identify whether the human took unnecessary actions such as performing an action even though there were no ML-generated alerts for a set of monitored traces, ignored ML guidance such as failing to take action even though there was an ML-generated alert for the set of monitored traces, or took an action contrary to the action recommended by the ML guidance system.

When circumstances change, a process may be executed to revisit a previous decision. If a decision was modified, then any decisions that depend on the altered decisions may be reconsidered. The data may be modelled in a bitemporal database to allow users to query decision rationale data not only as it actually was recorded in the past but also as it should have been recorded based on the changes in the circumstances. If a goal is changed, then any rationale that applies to the goal may be reconsidered and updated in the bitemporal database. Similar reconsideration may be applied if there are changes to criteria, such as new regulatory rules, or if new scientific discoveries alter the context. The queries may thus determine how the outcome may have differed if the ML-guidance system had the same information for a past decision.

5. Recorded Explanations and Machine-Learning Applications

In some embodiments, the decision rationales and data models described herein are integrated with one or more design rationale management tools. For example, a training dataset may comprise a set of outcomes and one or more corresponding decision rationales. The training dataset may be formed based on the recorded explanations that satisfy the end users during the query processes. The training dataset may be used to train one or more post-event root-cause analyses (RCA), Failure-Modes and Effects Analyses (FMEA) and/or other ML models. The training process may extrapolate patterns in the recorded explanations and/or associated rationale data to predict likely explanations for new examples in the future. A training process may include forming feature vectors based on the explanations and rationale data model, separating the dataset into training examples and test examples, generating a set of candidate ML model parameters, such as weights and biases, based on the training examples, and selecting the candidate ML model parameters that yield the lowest estimate error relative to the test examples. Example ML models used for RCA and FMEA may include artificial neural networks, support vector machines, MSET, and decision trees.

Once trained, the ML models may be applied to perform systematic automated RCA or FMEA when human-in-the-loop supervisory control decision making was part of the successful or catastrophic outcome. For example, a trained RCA model may be applied to isolate the root cause in a system where decisions are made across several nodes at several different levels. An FMEA model may be applied to identify and quantify potential failure modes within a system or asset. Responsive to detecting the root cause of a problem, the system may determine whether to trigger any downstream automated action to address the problem or notifying a human administrator about the predicted cause. Example downstream actions may include applying patches that address bugs or security issues, reconfiguring system resources to optimize system performance, bringing resources online to handle increased demand, migrating system resources to shift processes away from poorly performing nodes of execution, and/or shutting down system resources.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to an embodiment, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In an embodiment, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to an embodiment. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In an embodiment, a plugged-in microservice application may expose actions to the microservices manager. The exposed actions may receive, as input, data or an identification of a data object or location of data, that causes data to be moved into a data cloud.

In an embodiment, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In an embodiment, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
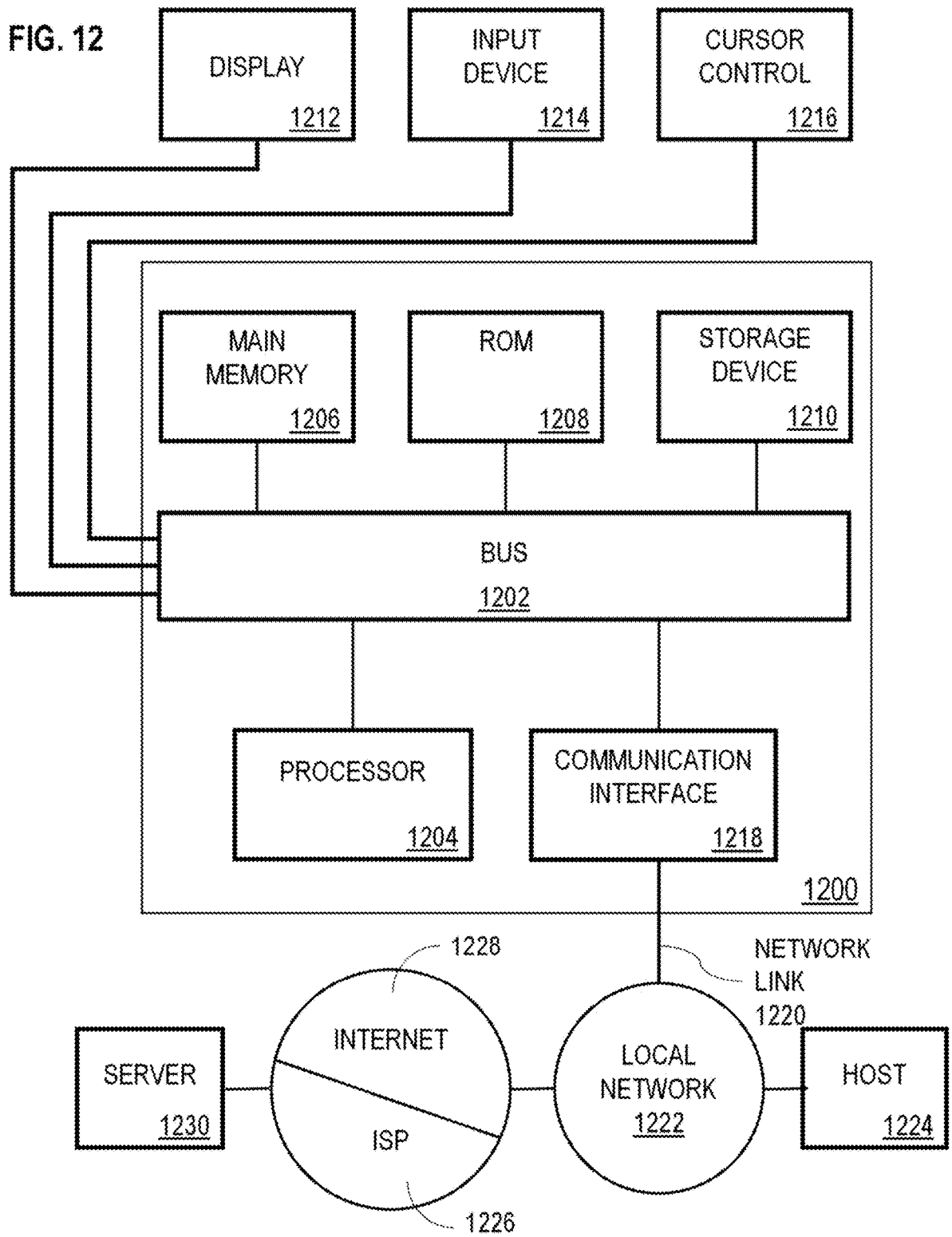
FIG. 12 is a block diagram that illustrates a computer system upon which one or more embodiments may be implemented.

For example, FIG. 12 is a block diagram that illustrates computer system 1200 upon which one or more embodiments may be implemented. Computer system 1200 includes bus 1202 or other communication mechanism for communicating information, and a hardware processor 1204 coupled with bus 1202 for processing information. Hardware processor 1204 may be, for example, a general purpose microprocessor.

Computer system 1200 also includes main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes read only memory (ROM) 1208 or other static storage device coupled to bus 1202 for storing static information and instructions for processor 1204. Storage device 1210, such as a magnetic disk or optical disk, is provided and coupled to bus 1202 for storing information and instructions.

Computer system 1200 may be coupled via bus 1202 to display 1212, such as a cathode ray tube (CRT) or light emitting diode (LED) monitor, for displaying information to a computer user. Input device 1214, which may include alphanumeric and other keys, is coupled to bus 1202 for communicating information and command selections to processor 1204. Another type of user input device is cursor control 1216, such as a mouse, a trackball, touchscreen, or cursor direction keys for communicating direction information and command selections to processor 1204 and for controlling cursor movement on display 1212. Input device 1214 typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1200 can receive the data on the network line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, within a database, a rationale data structure associated with at least one artificial-intelligence guided process that is supervised by at least one human operator and triggers automated actions using a set of one or more machine learning models, wherein the rationale data structure includes a set of links tracing a sequence of decisions over time leading to an outcome, wherein the set of links is traversable backwards through time, wherein the set of links identifies: (a) a plurality of outputs of the set of one or more machine learning models, (b) an indication of which of the plurality of outputs resulted in a prompt for human feedback, and (c) at least one action associated with the at least one human operator that lead to the outcome;
receiving a query for an explanation of the outcome of the at least one artificial-intelligence guided process that is supervised by the at least one human operator;
responsive to receiving the query, determining, based on a traversal of the set of links associating the plurality of outputs of the set of one or more machine learning models and the at least one action associated with the at least one human operator, whether the outcome was caused by human operator error or the set of one or more machine-learning models;
generating a query response indicating whether the outcome was caused by human operator error or at least one output of the plurality of outputs of the set of one or more machine-learning models; and
responsive to determining that outcome was caused by at least one output of the plurality of outputs of the set of one or more machine learning models, updating, based on the rationale data structure, one or more machine-learning model parameters to isolate at least one problem associated with the artificial-intelligence guided process causing the outcome.

2. The method of claim 1, wherein determining whether the outcome was caused by human operator error comprises: determining that the human operator performed an action that was not induced by guidance of one or more machine-learning processes.

3. The method of claim 1, wherein determining whether the outcome was caused by human operator error comprises: determining that an output of a machine-learning model generated an alarm for a set of one or more monitored traces and that the human operator did not perform evasive or mitigating actions.

4. The method of claim 1, wherein determining whether the outcome was caused by human operator error comprises: determining that an output of the machine-learning model generated an alarm for a set of one or more monitored traces and that the human operator performed a wrong evasive or mitigating action.

5. The method of claim 1, wherein the rationale data structure is generated as a function of a set of one or more logs, metadata, or traces relevant to the output of a machine-learning model.

6. The method of claim 1, further comprising: receiving a second query for further details associated with the explanation of the outcome; responsive to the second query, identifying, within a hierarchy of rationale data structures, a second set of one or more rationale data structures that are linked to the rationale data structure; and generating a second response to the second query for the further details associated with the explanation of the outcome based on the second set of one or more rationale data structures.

7. The method of claim 1, further comprising: receiving a second query to explain why an alternative was not included in the explanation; responsive to the second query, determining whether the alternative was considered; and generating a second response to the second query based at least in part on whether the alternative was considered.

8. The method of claim 1, wherein generating the rationale data structure comprises: receiving a set of raw data from a plurality of sensors; generating, based on the set of raw data, a set of perceptions; and generating, based on the set of perceptions, a set of hypotheses that explain a perceived situation, wherein the set of links include at least one link between the set of perceptions and the set of hypotheses.

9. The method of claim 1, wherein the one or more machine-learning models generate an output using a deterministic process.

10. The method of claim 1, further comprising: generating, by a training process, a training dataset based at least in part on the explanation of the outcome; training, by the training process as a function of the training dataset, one or more other machine learning models.

11. A non-transitory computer readable medium storing instructions which, when executed by one or more hardware processors, cause:
generating, within a database, a rationale data structure associated with at least one artificial-intelligence guided process that is supervised by at least one human operator and triggers automated actions using a set of one or more machine learning models, wherein the rationale data structure includes a set of links tracing a sequence of decisions over time leading to an outcome, wherein the set of links is traversable backwards through time, wherein the set of links identifies: (a) a plurality of outputs of the set of one or more machine learning models, (b) an indication of which of the plurality of outputs resulted in a prompt for human feedback, and (c) at least one action associated with the at least one human operator that lead to the outcome;
receiving a query for an explanation of the outcome of the at least one artificial-intelligence guided process that is supervised by the at least one human operator;
responsive to receiving the query, determining, based on a traversal of the set of links associating the plurality of outputs of the set of one or more machine learning models and the at least one action associated with the at least one human operator, whether the outcome was caused by human operator error or the set of one or more machine-learning models;
generating a query response indicating whether the outcome was caused by human operator error or at least one output of the plurality of outputs of the set of one or more machine-learning models; and
responsive to determining that outcome was caused by at least one output of the plurality of outputs of the set of one or more machine learning models, updating, based on the rationale data structure, one or more machine-learning model parameters to isolate at least one problem associated with the artificial-intelligence guided process causing the outcome.

12. The non-transitory computer-readable medium of claim 11, wherein determining whether the outcome was caused by human operator error comprises: determining that the human operator performed an action that was not induced by guidance of one or more machine-learning processes.

13. The non-transitory computer-readable medium of claim 11, wherein determining whether the outcome was caused by human operator error comprises: determining that an output of a machine-learning model generated an alarm for a set of one or more monitored traces and that the human operator did not perform evasive or mitigating actions.

14. The non-transitory computer-readable medium of claim 11, wherein determining whether the outcome was caused by human operator error comprises: determining that an output of the machine-learning model generated an alarm for a set of one or more monitored traces and that the human operator performed a wrong evasive or mitigating action.

15. The non-transitory computer-readable medium of claim 11, wherein the rationale data structure is generated as a function of a set of one or more logs, metadata, or traces relevant to the output of a machine-learning model.

16. The non-transitory computer-readable medium of claim 11, wherein the instructions further cause: receiving a second query for further details associated with the explanation of the outcome; responsive to the second query, identifying, within a hierarchy of rationale data structures, a second set of one or more rationale data structures that are linked to the rationale data structure; and generating a second response to the second query for the further details associated with the explanation of the outcome based on the second set of one or more rationale data structures.

17. The non-transitory computer-readable medium of claim 11, wherein the instructions further cause: receiving a second query to explain why an alternative was not included in the explanation; responsive to the second query, determining whether the alternative was considered; and generating a second response to the second query based at least in part on whether the alternative was considered.

18. The non-transitory computer-readable medium of claim 11, wherein generating the rationale data structure comprises: receiving a set of raw data from a plurality of sensors; generating, based on the set of raw data, a set of perceptions; and generating, based on the set of perceptions, a set of hypotheses that explain a perceived situation, wherein the set of links include at least one link between the set of perceptions and the set of hypotheses.

19. The non-transitory computer-readable medium of claim 11, the one or more machine-learning models generate an output using a deterministic process.

20. A system comprising:
one or more hardware processors;
one or more non-transitory computer-readable media storing instructions which, when executed by the one or more hardware processors, cause:
generating, within a database, a rationale data structure associated with at least one artificial-intelligence guided process that is supervised by at least one human operator and triggers automated actions using a set of one or more machine learning models, wherein the rationale data structure includes a set of links tracing a sequence of decisions over time leading to an outcome, wherein the set of links is traversable backwards through time, wherein the set of links identifies: (a) a plurality of outputs of the set of one or more machine learning models, (b) an indication of which of the plurality of outputs resulted in a prompt for human feedback, and (c) at least one action associated with the at least one human operator that lead to the outcome;
receiving a query for an explanation of the outcome of the at least one artificial-intelligence guided process that is supervised by the at least one human operator;
responsive to receiving the query, determining, based on a traversal of the set of links associating the plurality of outputs of the set of one or more machine learning models and the at least one action associated with the at least one human operator, whether the outcome was caused by human operator error or the set of one or more machine-learning models;

generating a query response indicating whether the outcome was caused by human operator error or at least one output of the plurality of outputs of the set of one or more machine-learning models; and responsive to determining that outcome was caused by at least one output of the plurality of outputs of the set of one or more machine learning models, updating, based on the rationale data structure, one or more machine-learning model parameters to isolate at least one problem associated with the artificial-intelligence guided process causing the outcome.

\* \* \* \* \*